United States Patent
Hommura et al.

(10) Patent No.: US 8,182,951 B2
(45) Date of Patent: May 22, 2012

(54) FUEL CELL SYSTEM

(75) Inventors: Satoru Hommura, Chiyoda-ku (JP); Susumu Saito, Chiyoda-ku (JP); Tetsuji Shimohira, Chiyoda-ku (JP); Atsushi Watakabe, Chiyoda-ku (JP); Junichi Tayanagi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/828,710

(22) Filed: Jul. 1, 2010

(65) Prior Publication Data

US 2011/0027677 A1  Feb. 3, 2011

Related U.S. Application Data

(60) Provisional application No. 61/299,585, filed on Jan. 29, 2010.

(30) Foreign Application Priority Data

Jul. 31, 2009  (JP) .................................. 2009-179064

(51) Int. Cl.
*H01M 8/04* (2006.01)
*H01M 8/10* (2006.01)

(52) U.S. Cl. ........................................ 429/428; 429/483

(58) Field of Classification Search .................. 429/428, 429/483

See application file for complete search history.

(56) References Cited

U.S. PATENT DOCUMENTS

| 7,429,428 B2 | 9/2008 | Watakabe |
| 7,667,083 B2 | 2/2010 | Kaneko et al. |
| 2007/0202377 A1* | 8/2007 | Hommura et al. .............. 429/33 |
| 2008/0014490 A1 | 1/2008 | Watakabe et al. |

FOREIGN PATENT DOCUMENTS

| JP | 2003-59494 | 2/2003 |
| JP | 3675473 | 5/2005 |
| WO | WO 2009/125795 A1 | 10/2009 |

OTHER PUBLICATIONS

Williams et al. (J. of Power Sources, 135, 122-134 (2004).*

* cited by examiner

*Primary Examiner* — Karie O'Neill Apicella
(74) *Attorney, Agent, or Firm* — Oblon, Spivak, McClelland, Maier & Neustadt, L.L.P.

(57) ABSTRACT

To provide a fuel cell system provided with a polymer electrolyte fuel cell which is excellent in the power generation characteristics under high temperature and low or no humidity conditions.

A fuel cell system 20 comprising a polymer electrolyte fuel cell 22 having a membrane/electrode assembly 10 having a catalyst layer containing a polymer (H) which has repeating units based on a perfluoromonomer having an alicyclic structure and has ion exchange groups, a temperature controlling means for controlling temperature of the polymer electrolyte fuel cell 22, a temperature sensor 38 for detecting temperature of the polymer electrolyte fuel cell 22, and a controlling device 40 for controlling the temperature controlling means based on temperature information from the temperature sensor 38 so that the maximum temperature of the polymer electrolyte fuel cell 22 becomes within the range of from 90 to 140° C.

14 Claims, 2 Drawing Sheets

FUEL CELL SYSTEM

BACKGROUND OF THE INVENTION

1. Field of the Invention

The present invention relates to a fuel cell system provided with a polymer electrolyte fuel cell.

2. Discussion of Background

As a proton conductive polymer contained in a catalyst layer of a membrane/electrode assembly for a polymer electrolyte fuel cell, the following polymer (1) is usually used (Patent Document 1).

A polymer (1) having sulfonic acid groups (—SO$_3$H groups) converted from —SO$_2$F groups in a polymer having repeating units based on a compound represented by the following formula (m14) and repeating units based on tetrafluoroethylene (hereinafter referred to as TFE):

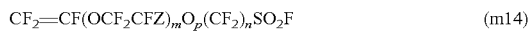

$$CF_2=CF(OCF_2CFZ)_mO_p(CF_2)_nSO_2F \qquad (m14)$$

wherein Z is a fluorine atom or a trifluoromethyl group, m is an integer of from 0 to 3, p is 0 or 1, and n is from 1 to 12, provided that m+p>0.

A polymer electrolyte fuel cell is required to be operated under high temperature (at least 90° C.) and low humidity conditions where the relative humidity of the reaction gas (fuel gas and oxidant gas) is low, or under no humidity conditions, in order to simplify the fuel cell system or to reduce the cost. For example, by operating a polymer electrolyte fuel cell under low or no humidity conditions, a humidifier can be downsized or omitted. Further, in fuel cell systems for automobiles, by operating a polymer electrolyte fuel cell under high temperature conditions, a radiator for cooling the polymer electrolyte fuel cell can be downsized. Further, in fuel cell systems for stationary use, by operating a polymer electrolyte fuel cell under high temperature conditions, water used for cooling the polymer electrolyte fuel cell can be recovered as hot water, and the hot water can be thereby used in various applications.

However, the power generation characteristics (such as output voltage) of conventional polymer electrolyte fuel cells in which the polymer (1) is used as a proton conductive polymer in a catalyst layer are insufficient under high temperature and low or no humidity conditions. Therefore, the conventional polymer electrolyte fuel cells are required to be operated under low temperature (about 80° C.) and high humidity conditions. Therefore, a relatively large size humidifier is required for conventional fuel cell systems. Further, for fuel cell systems for automobiles, a large size radiator is required. Further, for fuel cell systems for stationary use, since the temperature of hot water to be recovered is low, the application of the hot water is restricted.

Patent Document 1: Japanese Patent No. 3675473

SUMMARY OF THE INVENTION

The present invention provides a fuel cell system provided with a polymer electrolyte fuel cell which is excellent in the power generation characteristics under high temperature and low or no humidity conditions.

The fuel cell system of the present invention comprises a polymer electrolyte fuel cell having the following membrane/electrode assembly, a temperature controlling means for controlling temperature of the polymer electrolyte fuel cell, a temperature detection means for detecting temperature of the polymer electrolyte fuel cell, and a controlling means for controlling the temperature controlling means for controlling the maximum temperature of the polymer electrolyte fuel cell within a range of from 90 to 140° C., based on temperature information from the temperature detection means: (membrane/electrode assembly)

a membrane/electrode assembly, which comprises an anode having a catalyst layer containing a proton conductive polymer, a cathode having a catalyst layer containing a proton conductive polymer and a polymer electrolyte membrane disposed between the anode and the cathode, wherein the proton conductive polymer contained in the catalyst layer of at least one of the cathode and the anode is a polymer (H) which has repeating units based on a perfluoromonomer having an alicyclic structure or a perfluoromonomer capable of forming an alicyclic structure by cyclic polymerization, and has ion exchange groups.

The fuel cell system of the present invention further preferably contains a humidity controlling means for controlling humidity of oxidant gas supplied to the polymer electrolyte fuel cell, wherein the controlling means further controls the humidity controlling means based on temperature information from the temperature detection means so that the relative humidity of the oxidant gas supplied to the polymer electrolyte fuel is at most 30% at the temperature of the polymer electrolyte fuel cell.

Further, in the fuel cell system of the present invention, the oxidant gas supplied to the polymer electrolyte fuel cell is preferably not humidified.

The polymer (H) is preferably a polymer which has repeating units (A) based on a perfluoromonomer having an ion exchange group and repeating units (B) based on a perfluoromonomer having no ion exchange group, at least one of the repeating units (A) and the repeating units (B) having an alicyclic structure.

The polymer (H) preferably has an ion exchange capacity of from 1.2 to 2.8 meq/g dry resin.

The fuel cell system of the present invention comprises a polymer electrolyte fuel cell which is excellent in the power generation characteristics under high temperature and low or no humidity conditions, whereby a humidifier can be downsized or omitted. Further, in fuel cell systems for automobiles, a radiator can be downsized. Further, in fuel cell systems for stationary use, the application of hot water to be recovered is wide.

DETAILED DESCRIPTION OF THE INVENTION

Figure 1:
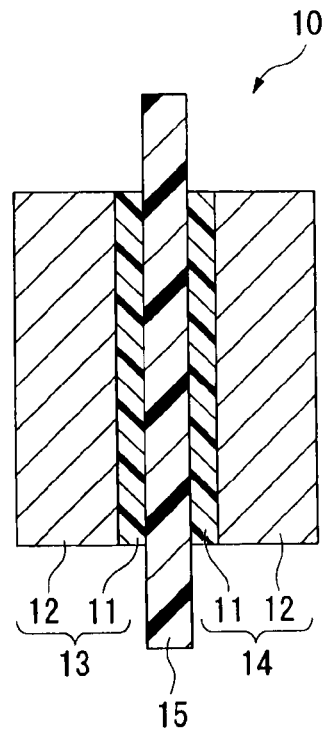
FIG. 1 is a cross section illustrating one example of a membrane/electrode assembly.

In the present specification, repeating units represented by the formula (u11) will be referred to as units (u11). The same applies to repeating units represented by other formulae.

Further, in the present specification, a compound represented by the formula (m11) will be referred to as a compound (m11). The same applies to compounds represented by other formulae.

Further, in the present specification, a group represented by the formula (g1) will be referred to as a group (g1). The same applies to groups represented by other formulae.

In the present specification, repeating units mean units derived from a monomer formed by polymerization of the monomer. The repeating units may be units directly formed by the polymerization reaction, or may be units having part of the units converted to another structure by treating the polymer.

Further, a monomer is a compound having a polymerizable carbon-carbon double bond.

Further, an ion exchange group is a group having H⁺, a monovalent metal cation, an ammonium ion or the like. Such an ion exchange group may, for example, be a sulfonic acid group, a sulfonimide group or a sulfonmethide group.

Further, a precursor group is a group capable of being converted to an ion exchange group by a known treatment such as hydrolysis or treatment for conversion to an acid form. Such a precursor group may, for example, be a —SO₂F group.

<Proton Conductive Polymer>

The proton conductive polymer is a polymer having ion exchange groups.

In the present invention, as the proton conductive polymer, a polymer (H) which has repeating units based on a perfluoromonomer having an alicyclic structure or a perfluoromonomer capable of forming an alicyclic structure by cyclic polymerization, and has ion exchange groups is used.

The alicyclic structure is a cyclic perfluoroaliphatic hydrocarbon group which may have one or two etheric oxygen atom.

The alicyclic structure may be present in the main chain or the side chain of the polymer (H).

The polymer (H) may, for example, be obtained by converting precursor groups in a polymer (F) which has repeating units based on a perfluoromonomer having an alicyclic structure or a perfluoromonomer capable of forming an alicyclic structure by cyclic polymerization, and has precursor groups of ion exchange groups, to ion exchange groups.

(Polymer (F))

The polymer (F) is preferably a polymer having repeating units (A') based on a perfluoromonomer having a precursor group of ion exchange group and repeating units (B) based on a perfluoromonomer having no ion exchange group, and as a case requires, other repeating units (C), at least one of the repeating units (A') and the repeating units (B) having an alicyclic structure.

Repeating Units (A'):

The repeating units (A') are repeating units based on a perfluoromonomer (hereinafter sometimes referred to as a monomer (a)) having a precursor group of an ion exchange group.

The monomer (a) having an alicyclic structure may, for example, be compounds (m11) to (m13), and is preferably the compound (m11) or the compound (m12) in view of a high effect of further improving the electrode performance of the polymer, more preferably the compound (m11) in view of easiness of preparation of the monomer.

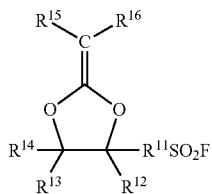

(m11)

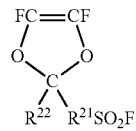

(m12)

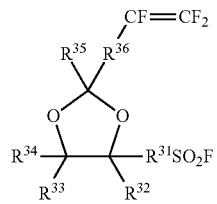

(m13)

$R^{11}$ is a bivalent perfluoroorganic group which may have an etheric oxygen atom. The organic group is a group having at least one carbon atom. The bivalent perfluoroorganic group is preferably a perfluoroalkylene group. In a case where the perfluoroalkylene group has an etheric oxygen atom, it may have one or more such oxygen atoms. Further, such an oxygen atom may be inserted between the carbon-carbon bond of the perfluoroalkylene group, or may be inserted at the terminal of the carbon atom bond. The perfluoroalkylene group may be linear or branched, and is preferably linear.

Each of $R^{12}$, $R^{13}$, $R^{15}$ and $R^{16}$ which are independent of one another, is a monovalent perfluoroorganic group which may have an etheric oxygen atom, or a fluorine atom. The monovalent perfluoroorganic group is preferably a perfluoroalkyl group. It is preferred that at least one of $R^{15}$ and $R^{16}$ is a fluorine atom, and it is more preferred that both of them are a fluorine atom, in view of high polymerizability.

$R^{14}$ is a monovalent perfluoroorganic group which may have an etheric oxygen atom, a fluorine atom or a —$R^{11}SO_2F$ group.

The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear. In a case where the compound (m11) has two $R^{11}$'s, the $R^{11}$'s may be the same groups or different groups.

$R^{21}$ is a $C_{1-6}$ perfluoroalkylene group or a $C_{2-6}$ perfluoroalkylene group having an etheric oxygen atom between the carbon-carbon bond. In a case where the perfluoroalkylene group has an etheric oxygen atom, it may have one or more such oxygen atoms. The perfluoroalkylene group may be linear or branched, and is preferably linear.

$R^{22}$ is a fluorine atom, a $C_{1-6}$ perfluoroalkyl group, a $C_{2-6}$ perfluoroalkyl group having an etheric oxygen atom between the carbon-carbon bond, or a —$R^{21}(SO_2X(SO_2R^f)_a)^-M^+$ group. In a case where the perfluoroalkyl group has an etheric oxygen atom, it may have one or more such oxygen atoms. The perfluoroalkyl group may be linear or branched, and is preferably linear. In a case where the compound (m12) has two $R^{21}$'s, the $R^{21}$'s may be the same groups or may be different groups.

$R^{31}$ is a $C_{1-6}$ perfluoroalkylene group or a $C_{2-6}$ perfluoroalkylene group having an etheric oxygen atom between the carbon-carbon bond. In a case where the perfluoroalkylene group has an etheric oxygen atom, it may have one or more such oxygen atoms. The perfluoroalkylene group may be linear or branched, and is preferably linear.

Each of $R^{32}$ to $R^{35}$ is a fluorine atom, a $C_{1-6}$ perfluoroalkyl group or a $C_{2-6}$ perfluoroalkyl group having an etheric oxygen atom between the carbon-carbon bond. In a case where the perfluoroalkyl group has an etheric oxygen atom, it may have one or more such oxygen atoms. The perfluoroalkyl group may be linear or branched, and is preferably linear.

$R^{36}$ is a single bond, a $C_{1-6}$ perfluoroalkylene group or a $C_{2-6}$ perfluoroalkylene group having an etheric oxygen atom between the carbon-carbon bond. In a case where the perfluoroalkylene group has an etheric oxygen atom, it may have one or more such oxygen atoms. The perfluoroalkylene group may be linear or branched, and is preferably linear.

The compound (m11) may, for example, be compounds (m11-1) to (m11-4), and is particularly preferably the compound (m11-1), in view of easiness of preparation and high polymerizability.

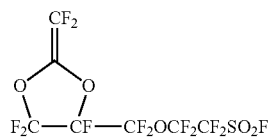
(m11-1)

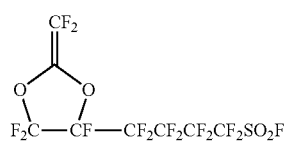
(m11-2)

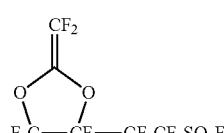
(m11-3)

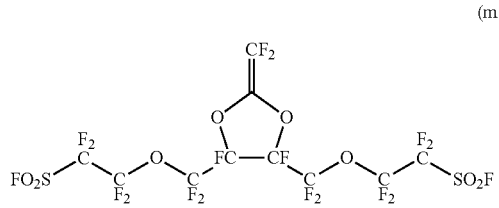
(m11-4)

The compound (m12) may, for example, be a compound (m12-1) or a compound (m12-2).

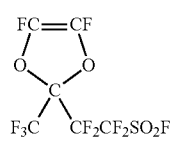
(m12-1)

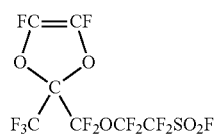
(m12-2)

The compound (m13) may, for example, be a compound (m13-1) or a compound (m13-2).

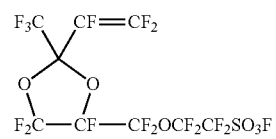
(m13-1)

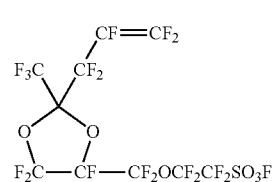
(m13-2)

The compound (m11) can be prepared by a method disclosed in WO2003/037885, JP-A-2005-314388, JP-A-2009-040909, etc.

The compound (m12) can be prepared by a method disclosed in JP-A-2006-152249, etc.

The compound (m13) can be prepared by a method disclosed in JPA-2006-241302, etc.

The monomer (a) having no alicyclic structure may, for example, be a compound (m14) or a compound (m15). The compound (m15) is preferred, since the water content can be suppressed, even though the proton conductivity of the polymer is increased, and as a result, higher power generation characteristics can be obtained even under low or no humidity conditions and under high humidity conditions.

(m14)

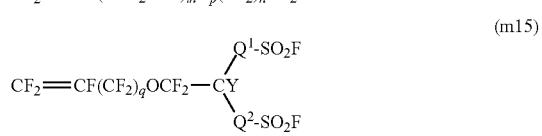
(m15)

Z is a fluorine atom or a trifluoromethyl group, m is an integer of from 0 to 3, p is 0 or 1, and n is from 1 to 12, provided that m+p>0.

$Q^1$ is a perfluoroalkylene group which may have an etheric oxygen atom.

$Q^2$ is a single bond or a perfluoroalkylene group which may have an etheric oxygen atom.

In a case where the perfluoroalkylene group of $Q^1$ or $Q^2$ has an etheric oxygen atom, it may have one or more such oxygen atoms. Further, such an oxygen atom may be inserted between the carbon-carbon bond of the perfluoroalkylene group, or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the fluoromonomer as a starting material will be low, whereby purification by distillation will be easy. Further, when the number of carbon atoms is at most 6, a decrease in the ion exchange capacity of the polymer (H) will be suppressed, and a decrease in the proton conductivity will be suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability of power generation performance will be obtained when a polymer electrolyte fuel cell is operated for a long period of time as compared with a case where $Q^2$ is a single bond.

It is preferred that at least one of $Q^1$ and $Q^2$ is a $C_{1-6}$ perfluoroalkylene group having an etheric oxygen atom. A fluoromonomer having a $C_{1-6}$ perfluoroalkylene group having an etheric oxygen atom can be prepared without fluorination reaction by a fluorine gas, and is thereby easily produced with good yield.

Y is a fluorine atom or a monovalent perfluoroorganic group.

Y is preferably a fluorine atom or a $C_{1-6}$ linear perfluoroalkyl group which may have an etheric oxygen atom.

q is 0 or 1.

The compound (m14) is preferably compounds (m14-1) to (m14-3).

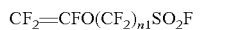  (m14-1),

  (m14-2),

  (m14-3).

Here, each of n1, n2 and n3 is an integer of from 1 to 8, and m3 is an integer of from 1 to 3.

The compound (m15) is preferably compounds (m15-1) to (m15-3), particularly preferably the compound (m15-1) in view of easiness of preparation of the polymer (H) and easiness of industrial application.

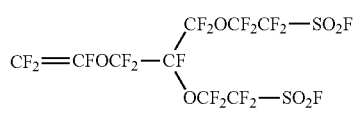  (m15-1)

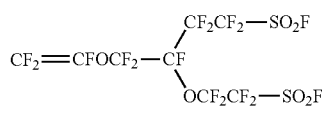  (m15-2)

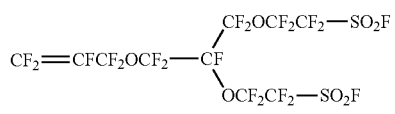  (m15-3)

The compound (m14) can be prepared by a method disclosed in Prog. Polym. Sci., vol. 12, 1986, p. 233-237, U.S. Pat. No. 4,330,654, etc.

The compound (m15) can be prepared by a method disclosed in WO2007/013533, JP-A-2008-202039, etc.

Repeating Units (B):

Repeating units (B) are repeating units based on a perfluoromonomer (hereinafter sometimes referred to as a monomer (b)) having no ion exchange group.

The monomer (b) having an alicyclic structure may, for example, compounds (m21) to (m23), and is preferably the compound (m21) or the compound (m22) in view of a high effect of further improving the electrode performance of the polymer.

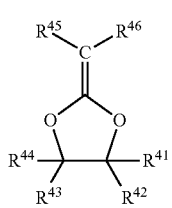  (m21)

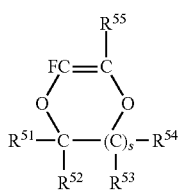  (m22)

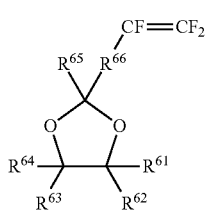  (m23)

Each of $R^{41}$ to $R^{46}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

It is preferred that at least one of $R^{45}$ and $R^{46}$ is a fluorine atom, and it is more preferred that both of them are a fluorine atom, in view of high polymerizability.

s is 0 or 1.

Each of $R^{51}$ and $R^{52}$ which are independent of each other, is a fluorine atom or a $C_{1-5}$ perfluoroalkyl group, or they may be bonded to form a Spiro ring (provided that when s is 0).

Each of $R^{53}$ and $R^{54}$ which are independent of each other, is a fluorine atom or a $C_{1-5}$ perfluoroalkyl group.

$R^{55}$ is a fluorine atom, a $C_{1-5}$ perfluoroalkyl group or a $C_{1-5}$ perfluoroalkoxy group. $R^{55}$ is preferably a fluorine atom in view of high polymerizability.

The perfluoroalkyl group and the perfluoroalkoxy group may be linear or branched, and are preferably linear.

Each of $R^{61}$ to $R^{65}$ is a fluorine atom, a $C_{1-6}$ perfluoroalkyl group or a $C_{2-6}$ perfluoroalkyl group which may have an etheric oxygen atom between the carbon-carbon bond. In a case where the perfluoroalkyl group has an etheric oxygen atom, it may have one or more such oxygen atoms. The perfluoroalkyl group may be linear or branched, and is preferably linear.

$R^{66}$ is a single bond, a $C_{1-6}$ perfluoroalkylene group or a $C_{2-6}$ perfluoroalkylene group which may have an etheric oxygen atom between the carbon-carbon bond. In a case where the perfluoroalkylene group has an etheric oxygen atom, it may have one or more such oxygen atoms. The perfluoroalkylene group may be linear or branched, and is preferably linear.

The compound (m21) may, for example, be a compound (m21-1) or a compound (m21-2), and is particularly preferably the compound (m21-1) in view of easiness of preparation and high polymerizability.

(m21-1)

$$\text{CF}_2=\underset{\underset{F_2C-CF-CF_3}{O\diagup\diagdown O}}{C}$$

(m21-2)

$$\text{CF}_2=\underset{\underset{F_2C-CF-CF_2CF_2CF_2CF_3}{O\diagup\diagdown O}}{C}$$

The compound (m22) may, for example, be compounds (m22-1) to (m22-11), and is particularly preferably the compound (m22-1) in view of a high effect of further improving electrode performance of the polymer.

(m22-1) with F₃C, CF₃ substituents (m22-2)

(m22-3) with F, CF₃ substituents (m22-4) with F, C₂F₅ substituents (m22-5) with F₃C, C₂F₅ substituents (m22-6) with F₃C, C₅F₁₁ substituents (m22-7) with OCF₃, CF₂ substituents (m22-8) with OCF₃, F₃C, CF₃ substituents (m22-9)

(m22-10) with CF₃ substituent (m22-11) with F₃C, FC, CF₂, CF₂, CF₂ substituents

The compound (m23) may, for example, be a compound (m23-1) or a compound (m23-2).

(m23-1) with F₃C, CF=CF₂, F₂C—CF—CF₃

(m23-2) with F₃C, CF₂, CF=CF₂, F₂C—CF—CF₃

The compound (m21) can be prepared by a method disclosed in WO2000/056694; Izvestiya Akademii Nauk SSSR, Seriya Khimicheskaya, 1989, vol. 4, p. 938-42, etc.

The compound (m22) can be prepared by a method disclosed in Macromolecule, vol. 26, No. 22, 1993, p. 5829-5834; JP-A-6-92957, etc.

The compound (m23) can be prepared by a method disclosed in JP-A-2006-241302, etc.

The monomer (b) capable of forming an alicyclic structure by cyclic polymerization may, for example, be a compound (m24).

$$CF(R^{71})=C(R^{73})-O-CF(R^{76})-CF(R^{75})-C(R^{74})=CF(R^{72}) \tag{m24}$$

Each of $R^{71}$ to $R^{76}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

Each of $R^{71}$ to $R^{74}$ is more preferably a fluorine atom in view of high polymerizability.

The compound (m24) may, for example, be compounds (m24-1) to (m24-3), and is particularly preferably the compound (m24-1) in view of easiness of preparation of the monomer.

$$CF_2\!=\!CF\!-\!O\!-\!CF_2\!-\!CF_2\!-\!CF\!=\!CF_2 \quad (m24\text{-}1)$$

$$CF_2\!=\!CF\!-\!O\!-\!CF_2\!-\!CF(CF_3)\!-\!CF\!=\!CF_2 \quad (m24\text{-}2)$$

$$CF_2\!=\!CF\!-\!O\!-\!CF(CF_3)\!-\!CF_2\!-\!CF\!=\!CF_2 \quad (m24\text{-}3)$$

The compound (m24) can be prepared by a method disclosed in Macromol. Symp., vol. 98, 1995, p. 753-767, etc.

The monomer (b) having no alicyclic structure may, for example, be TFE, perfluoro(3-butenyl vinyl ether), perfluoro (allyl vinyl ether), a perfluoro α-olefin (such as hexafluoropropylene) or a perfluoro(alkyl vinyl ether). The monomer (b) is particularly preferably TFE. TFE, which has high crystallinity, has an effect of suppressing swelling when the polymer (H) contains water, and can reduce the water content of the polymer (H).

Further, as the monomer (b), a perfluoromonomer (hereinafter sometimes referred to as a monomer (b")) having at least two polymerizable carbon-carbon double bonds may be used. By use of the monomer (b"), the molecular weight of the polymer (F) can be increased.

The monomer (b") may, for example, be a compound (m31) (excluding the compound (m24)) or a compound (m32).

(m31) [structure]

(m32) $CF_2\!=\!CF\!-\!Q^4\!-\!CF\!=\!CF_2$ $Q^3$ is a single bond, an oxygen atom, or a $C_{1\text{-}10}$ perfluoroalkylene group which may have an etheric oxygen atom.

$Q^4$ is an oxygen atom or a linear or branched perfluoroalkylene group which may have an etheric oxygen atom.

The compound (m31) is preferably compounds (m31-1) to (m31-6) in view of easiness of preparation and high polymerizability.

(m31-1) [structure]

(m31-2) [structure]

(m31-3) [structure]

(m31-4) [structure]

(m31-5) [structure]

(m31-6) [structure]

The compound (m32) is preferably compounds (m32-1) to (m32-3) in view of easiness of preparation.

$$CF_2\!=\!CFOCF\!=\!CF_2 \quad (m32\text{-}1)$$

$$CF_2\!=\!CFO(CF_2)_h OCF\!=\!CF_2 \quad (m32\text{-}2)$$

$$CF_2\!=\!CF[OCF_2CF(CF_3)]_iO(CF_2)_k[OCF(CF_3)CF_2]_jOCF\!=\!CF_2 \quad (m32\text{-}3)$$

Here, each of h and k is an integer of from 2 to 8, each of i and j which are independent of each other, is an integer of from 0 to 5, and i+j≧1.

The amount of addition of the monomer (b") is preferably from 0.001 to 20 mol % based on 100 mol % of all monomers (the total of the monomer (a) and the monomer (b)) constituting the polymer (F). If it is less than 0.001 mol %, no sufficient effect of increasing the molecular weight will be obtained, and if it is larger than 20 mol %, production of the polymer (F) will be difficult due to the difference of the reactivity between the monomer (a) and the monomer (b).

Other Repeating Units (C):

Other repeating units (C) are repeating units based on a monomer (hereinafter sometimes referred to as a monomer (c)) other than the monomer (a) and the monomer (b).

The monomer (c) may, for example, be chlorotrifluoroethylene, trifluoroethylene, vinylidene fluoride, vinyl fluoride, ethylene, propylene, a (perfluoroalkyl)ethylene (such as (perfluorobutyl)ethylene) or a (perfluoroalkyl)propene (such as 3-perfluorooctyl-1-propene).

Production of Polymer (F):

The polymer (F) is produced by polymerizing the monomer (a) and the monomer (b) and as the case requires, the monomer (c).

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical initiator.

The polymerization temperature is usually from 10 to 150° C.

The radical initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate, and a perfluoro compound such as a bis(fluoroacyl) peroxide is preferred from such a viewpoint that the polymer (F) substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1 H-perfluorohexane), a hydrochlorofluorocarbon (such as 3,3-dichloro-1,1,1,2,2-pentafluoropropane or 1,3-dichloro-1,1,2,2,3-pentafluoropropane) or a hydrofluoroether (such as $CF_3CH_2OCF_2CF_2H$).

In the solution polymerization method, monomers, a radical initiator, etc. are added to a solvent, and radicals are formed in the solvent to carry out polymerization of the monomers. The addition of the monomers may be all at once, sequentially or continuously.

In the suspension polymerization method, water is used as a dispersion medium, and in the dispersion medium, monomers, a non-ionic radical initiator, etc. are added to let radicals form in the dispersion medium thereby to carry out polymerization of the monomers.

The non-ionic radical initiator may, for example, be a bis (fluoroacyl) peroxide, a bis(chlorofluoroacyl) peroxide, a dialkylperoxy dicarbonate, a diacyl peroxide, a peroxy ester, a dialkyl peroxide, a bis(fluoroalkyl) peroxide or an azo compound.

To the dispersion medium, the above-mentioned solvent; a surfactant as a dispersion stabilizer to prevent agglomeration of suspended particles; a hydrocarbon compound (such as hexane or methanol) as a molecular-weight controlling agent, etc., may be added as assisting agents.

(Polymer (H))

The polymer (H) is a polymer having ion exchange groups converted from precursor groups in the polymer (F).

The polymer (H) is preferably a polymer having repeating units (A) based on a perfluoromonomer having an ion exchange group and repeating units (B) based on a perfluoromonomer having no ion exchange group and as the case requires, other repeating units (C), at least one of the repeating units (A) and the repeating units (B) having an alicyclic structure.

Repeating Units (A):

Repeating units (A) are repeating units having ion exchange groups converted from the precursor groups in the repeating units (A').

The ion exchange group is preferably a group (g1).

$M^+$ is $H^+$, a monovalent metal cation or an ammonium ion in which at least one hydrogen atom may be substituted by a hydrocarbon group, and is preferably $H^+$ from the viewpoint of high proton conductivity.

$R^f$ is a linear or branched perfluoroalkyl group which may have an etheric oxygen atom. The number of carbon atoms in the perfluoroalkyl group is preferably from 1 to 8, more preferably from 1 to 6. In a case where there are two or more $R^f$s, the respective $R^f$s may be the same groups or different groups.

X is an oxygen atom, a nitrogen atom or a carbon atom, provided that when X is an oxygen atom, a=0, when X is a nitrogen atom, a=1, and when X is a carbon atom, a=2.

The group (g1) may, for example, be a sulfonic acid group ($—SO_3^-M^+$ group), a sulfonimide group ($—SO_2N(SO_2R^f)^-M^+$ group) or a sulfonmethide group ($—SO_2C(SO_2R^f)_2^-M^+$ group).

The repeating units (A) having an alicyclic structure may, for example, be units (u11) to (u13), and are preferably the units (u11) or the units (u12) in view of a high effect of further improving electrode performance of the polymer, more preferably the units (u11) in view of easiness of preparation of the monomer.

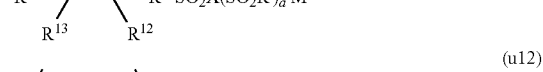

$R^{11}$ to $R^{13}$, $R^{15}$ and $R^{16}$ are as defined for the compound (m11).

$R^{14}$ is a monovalent perfluoroorganic group which may have an etheric oxygen atom, a fluorine atom, or a $—R^{11}(SO_2X(SO_2R^f)_a^-M^+$ group.

$R^{21}$ and $R^{22}$ are as defined for the compound (m12).

$R^{31}$ to $R^{36}$ are as defined for the compound (m13).

$R^f$, X and "a" are as defined for the group (g1).

The units (u11) are particularly preferably units (u11-1) in view of easiness of preparation of the monomer (a) constituting the repeating units (A).

The units (u12) may, for example, be units (u12-1) or units (u12-2).

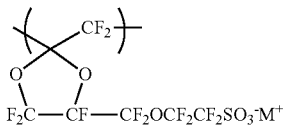
(u11-1)

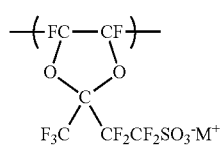
(u12-1)

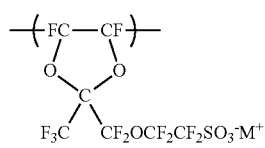
(u12-2)

The repeating units (A) having no alicyclic structure may, for example, be units (u14) or units (u15), and are preferably the units (u15) since even though the proton conductivity of the polymer is increased, the water content can be suppressed, and as a result, higher power generation characteristics can be obtained under low or no humidity conditions and under high humidity conditions.

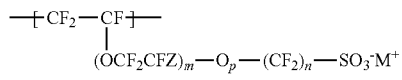
(u14)

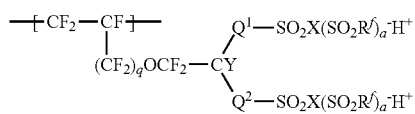
(u15)

Z, m, p and n are as defined for the compound (m14).
$Q^1$, $Q^2$, Y and q are as defined for the compound (m15).
$Rf$, X and "a" are as defined for the group (g1).
The units (u15) are preferably units (u1-1) to (u1-3) in view of easiness of preparation of the polymer (H) and easiness of industrial application, particularly preferably the units (u1-1).

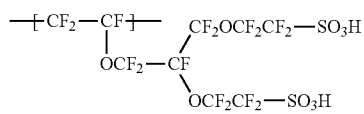
(u15-1)

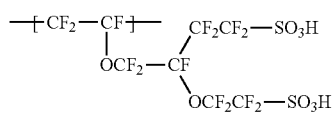
(u15-2)

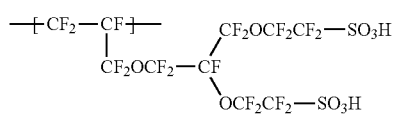
(u15-3)

Repeating Units (B):

Repeating units (B) are repeating units based on a monomer (b).

Repeating units based on the monomer (b) having an alicyclic structure may, for example, be units (u21) to (u23), and are preferably the units (u21) or the units (u22) in view of a high effect of further improving electrode performance of the polymer.

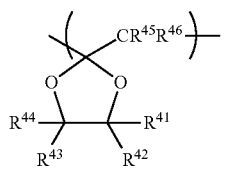
(u21)

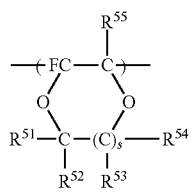
(u22)

(u23)

$R^{41}$ and $R^{46}$ are as defined for the compound (m21).
s and $R^{51}$ to $R^{55}$ are as defined for the compound (m22).
$R^{61}$ to $R^{66}$ are as defined for the compound (m23).
The units (u21) are particularly preferably units (u21-1) in view of easiness of preparation of the monomer.
The units (u22) are particularly preferably units (u22-1) in view of a high effect of further improving electrode performance of the polymer.

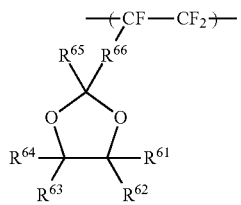
(u21-1)

(u22-1)

Repeating units based on the monomer (b) capable of forming an alicyclic structure by cyclic polymerization may, for example, be units (u24). $R^{71}$ to $R^{76}$ are as defined for the compound (m24).

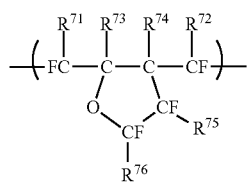
(u24)

The units (u24) are particularly preferably units (u24-1) in view of easiness of preparation of the monomer.

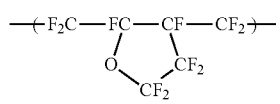
(u24-1)

The repeating units based on the monomer (b) having no alicyclic structure are particularly preferably repeating units based on TFE with a view to decreasing the water content of the polymer (H).

Other Repeating Units (C):

Other repeating units (C) are repeating units based on a monomer (c).

Ion exchange capacity:

The ion exchange capacity of the polymer (H) is preferably from 1.2 to 2.8 meq/g dry resin, more preferably from 1.3 to 2.3 meq/g dry resin. When the ion exchange capacity is at least 1.2 meq/g dry resin, the polymer (H) has high electrical conductivity and accordingly when it is used as a proton conductive polymer of a catalyst layer of a polymer electrolyte fuel cell, sufficient cell output will be obtained. When the ion exchange capacity is at most 2.8 meq/g dry resin, preparation of a polymer (F) will be easy.

In order that the polymer (H) may have an ion exchange capacity of at least 1.2 meq/g dry resin, the proportion of the monomer (a) when the polymer (F) is prepared is adjusted. Specifically, it is important to control the monomer composition at the time of the polymerization, and for that purpose, it is necessary to determine the charge composition considering the polymerizabilities of monomers. Further, when two or more types of monomers are reacted, it is possible to let the reaction proceed at a constant composition by successively or continuously adding a monomer having a higher reactivity.

Production of Polymer (H):

The polymer (H) is produced by converting the precursor groups in the polymer (F) to ion exchange groups.

As a method of converting $-SO_2F$ groups to sulfonic acid groups ($-SO_3^-H^+$ groups), the following method (i) may be mentioned, and as a method of converting $-SO_2F$ groups to sulfonimide groups ($-SO_2N(SO_2R^f)^-H^+$ groups), the following method (ii) may be mentioned.

(i) A method of hydrolyzing $-SO_2F$ groups in the polymer (F) to a sulfonic acid salt and then converting the sulfonic acid salt to acid-form to obtain sulfonic acid groups.

(ii) A method of imidizing $-SO_2F$ groups in the polymer (F) to salt-form sulfonimide groups, followed by conversion to acid-form to form acid-form sulfonimide groups.

Method (i):

The hydrolysis is carried out, for example, by contacting the polymer (F) with a basic compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonic acid salt with an aqueous solution of hydrochloric acid, sulfuric acid or the like.

The hydrolysis and conversion to acid-form are carried out usually at a temperature of from 0 to 120° C.

Method (ii):

As the imidation, the following methods may, for example, be mentioned.

(ii-1) A method of reacting $-SO_2F$ groups with $R^fSO_2NHM$.

(ii-2) A method of reacting $-SO_2F$ groups with $R^fSO_2NH_2$ in the presence of an alkali metal hydroxide, an alkali metal carbonate, MF, ammonia or a primary to tertiary amine.

(ii-3) A method of reacting $-SO_2F$ groups with $R^fSO_2NMSi(CH_3)_3$.

Here, M is an alkali metal or a primary to quaternary ammonium.

The conversion to acid-form is carried out by treating the polymer having salt-form sulfonimide groups with an acid (such as sulfuric acid, nitric acid or hydrochloric acid).

Further, the polymer (H) wherein ion exchange groups are sulfonimide groups may also be produced by polymerizing a monomer (a') having a sulfonimide group converted from a $-SO_2F$ group in the monomer (a), and the monomer (b), and as the case requires, other monomer (c).

The monomer (a') may be produced by adding chlorine or bromine to the carbon-carbon double bond in the monomer (a), and converting a $-SO_2F$ group to a sulfonimide group by the method (ii), followed by a dechlorination or debromination reaction by means of metallic zinc.

The above-described polymer (H) of the present invention has repeating units based on a perfluoromonomer having an alicyclic structure or a perfluoromonomer capable of forming an alicyclic structure by cyclic polymerization, and accordingly a membrane/electrode assembly having a catalyst layer containing the polymer (H) can exhibit sufficient power generation characteristics (such as output voltage) under high temperature and low or no humidity conditions.

<Liquid Composition>

The liquid composition of the present invention is a composition comprising a dispersion medium and the polymer (H) dispersed in the dispersion medium.

The dispersion medium contains an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3,-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol.

The organic solvents having a hydroxy group may be used alone or as a mixture of two or more of them.

The dispersion medium preferably contains water.

The proportion of water is preferably from 10 to 99 mass %, more preferably from 40 to 99 mass % in the dispersion medium (100 mass %). Dispersibility of the polymer (H) in the dispersion medium can be improved by increasing the proportion of water.

The proportion of the organic solvent having a hydroxy group is preferably from 1 to 90 mass %, more preferably from 1 to 60 mass % in the dispersion medium (100 mass %).

The proportion of the polymer (H) is preferably from 1 to 50 mass %, more preferably from 3 to 30 mass % in the liquid composition (100 mass %).

With respect to a method of preparing the liquid composition, several reports have been made, and for example, the liquid composition can be prepared in accordance with a preparation method disclosed in JP-B-4-35226, JP-A-2001-504872, JP-A-2005-82749, WO2006/38928, JP-A-2004-519296, etc.

A specific method of preparing the liquid composition may be a method of applying shearing such as stirring to the electrolyte material in the dispersion medium under atmospheric pressure or in a state where it is sealed in an autoclave or the like. The preparation temperature is preferably from 0 to 250° C., more preferably from 20 to 150° C. As the case requires, shearing such as ultrasonic waves may be applied.

Further, in a case where shearing such as stirring is applied to a mixed liquid having the electrolyte material, an organic solvent and water mixed to obtain a liquid composition, shearing such as stirring may be applied to a mixed liquid obtained by adding an organic solvent and water all at once to the electrolyte material, or the organic solvent and water may be dividedly added to the electrolyte material several times, and shearing such as stirring is applied at intervals between the additions. For example, shearing such as stirring is applied to a mixed liquid having part of the organic solvent and part of water added to the electrolyte material, and then the rest of the organic solvent and water is added to the mixed liquid, and shearing such as stirring is applied again. Otherwise, only the organic solvent is added to the electrolyte material, and shearing such as stirring is added, and then only water is added, and shearing such as stirring is applied again.

The liquid composition is suitably used for formation of a catalyst layer of a membrane/electrode assembly as described hereinafter.

<Membrane/Electrode Assembly>

FIG. 1 is a cross section illustrating one example of a membrane/electrode assembly (hereinafter referred to as a membrane/electrode assembly) for a polymer electrolyte fuel cell. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a supported catalyst having platinum or a platinum alloy supported on a carbon carrier.

The carbon carrier may, for example, be a carbon black powder.

The proton conductive polymer may be the polymer (H) of the present invention or a known proton conductive polymer. The proton conductive polymer contained in the catalyst layer of at least one of the cathode and the anode is the polymer (H) of the present invention, and it is preferred that the proton conductive polymer contained in the catalyst layer of the cathode is the polymer (H) of the present invention.

The catalyst layer 11 may contain a water-repellent agent with a view to increasing the effect to suppress flooding. The water-repellent agent may, for example, be a tetrafluoroethylene/hexafluoropropylene copolymer, a tetrafluoroethylene/perfluoro(alkyl vinyl ether) copolymer or polytetrafluoroethylene. The water-repellent agent is preferably a fluoropolymer soluble in a solvent, from such a viewpoint that the water repellent treatment of the catalyst layer 11 is easy. The amount of the water-repellent agent is preferably from 0.01 to 30 mass % in the catalyst layer (100 mass %).

As a method of forming the catalyst layer 11, the following methods may be mentioned.

(i) A method of applying a fluid for forming a catalyst layer on the polymer electrolyte membrane 15, the gas diffusion layer 12 or a carbon layer 16, followed by drying.

(ii) A method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the proton conductive polymer and the catalyst dispersed in a dispersion medium. The fluid for forming a catalyst layer may be prepared, for example, by mixing the liquid composition of the present invention with a dispersion of the catalyst.

(Gas Diffusion Layer)

The gas diffusion layer 12 has a function to uniformly diffuse a gas into the catalyst layer 11 and a function as a current collector.

The gas diffusion layer 12 may, for example, be carbon paper, carbon cloth or carbon felt.

The gas diffusion layer 12 is preferably subjected to water repellent treatment e.g. by polytetrafluoroethylene.

(Carbon Layer)

Figure 2:
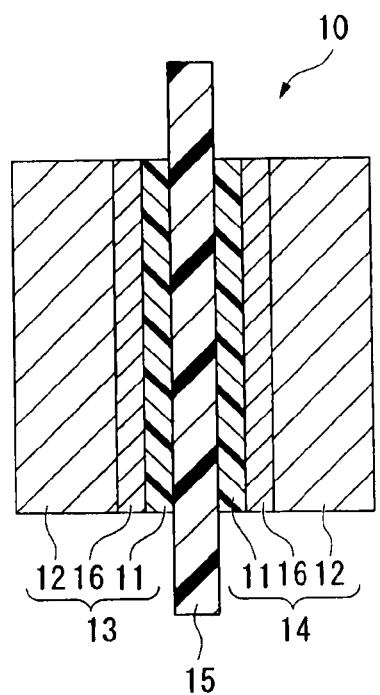
FIG. 2 is a cross section illustrating another example of a membrane/electrode assembly.

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the power generation performance of a polymer electrolyte fuel cell will be remarkably improved.

The carbon layer 16 is a layer containing carbon and a nonionic fluoropolymer.

The carbon is preferably carbon nanofibers having a fiber diameter of from 1 to 1,000 nm and a carbon length of at most 1,000 μm.

The nonionic fluoropolymer may, for example, be polytetrafluoroethylene.

(Polymer Electrolyte Membrane)

The polymer electrolyte membrane 15 is a membrane containing a proton conductive polymer.

The proton conductive polymer may be the polymer (H) of the present invention or a known proton conductive polymer. The known proton conductive polymer may, for example, be a polymer having sulfonic acid groups converted from —$SO_2F$ groups in a polymer having repeating units based on the compound (m14) and repeating units based on TFE; or a polymer having sulfonic acid groups converted from —$SO_2F$ groups in a polymer having repeating units based on the compound (m15) and repeating units based on TFE.

The polymer electrolyte membrane 15 can be formed, for example, by a method (a casting method) wherein a liquid composition of the proton conductive polymer is applied on a substrate film or the catalyst layer 11, followed by drying.

The liquid composition is a dispersion having the proton conductive polymer dispersed in a dispersion medium containing an organic solvent having a hydroxy group and water.

In order to stabilize the polymer electrolyte membrane 15, it is preferred to carry out heat treatment. The temperature for the heat treatment is preferably from 130 to 200° C. depending on the type of the proton conductive polymer. When the temperature for the heat treatment is at least 130° C., the proton conductive polymer will not excessively contain water. When the temperature for the heat treatment is at most 200° C., heat decomposition of ion exchange groups may be suppressed, and a decrease in the proton conductivity of the polymer electrolyte membrane 15 may be suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material of the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and if it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Process for Producing Membrane/Electrode Assembly)

The membrane/electrode assembly 10 is produced, for example, by the following method.

(i) A method of forming catalyst layers 11 on a polymer electrolyte membrane 15 to form a membrane/catalyst layer assembly, and sandwiching such a membrane/catalyst layer assembly between gas diffusion layers 12.

(ii) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(i) A method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12.

(ii) A method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16.

The above-described membrane/electrode assembly 10 is excellent in the power generation characteristics under high temperature and low or no humidity conditions since the catalyst layer 11 contains the polymer (H) of the present invention.

<Fuel Cell System>
(First Embodiment)

Figure 3:
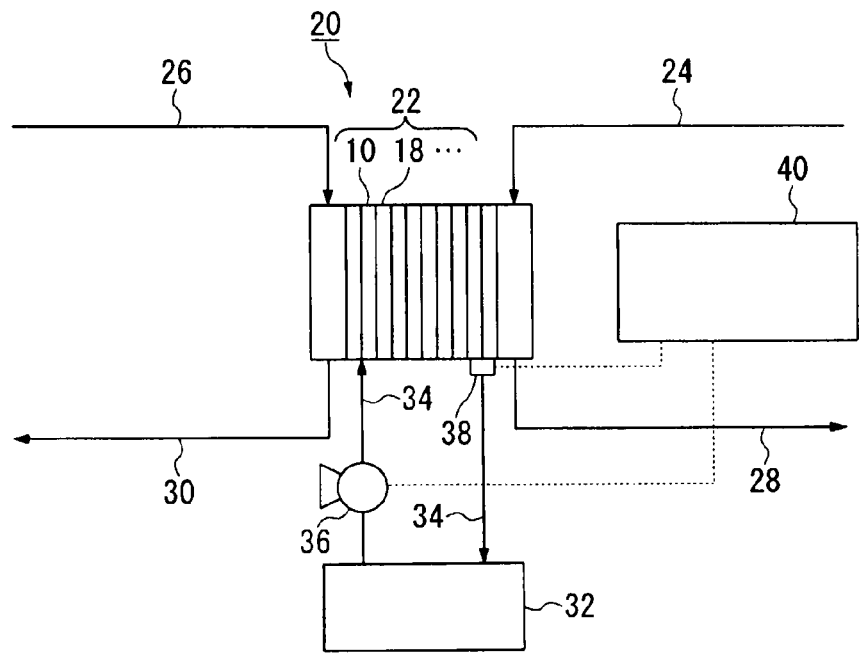
FIG. 3 is a view schematically illustrating one example of the fuel cell system of the present invention.

FIG. 3 is a view schematically illustrating one example of the fuel cell system of the present invention.

A fuel cell system 20 comprises a polymer electrolyte fuel cell 22 having plural membrane/electrode assemblies 10, an oxidant gas supplying pathway 24 which supplies oxidant gas (such as air) to a cathode side of the polymer electrolyte fuel cell 22, a fuel gas supplying pathway 26 which supplies fuel gas (such as hydrogen) to an anode side of the polymer electrolyte fuel cell 22, a cathode exhaust gas pathway 28 which discharges cathode exhaust gas exhausted from the cathode side of the polymer electrolyte fuel cell 22, an anode exhaust gas pathway 30 which discharges anode exhaust gas exhausted from the anode side of the polymer electrolyte fuel cell 22, a radiator 32 (temperature controlling means) for decreasing temperature of a refrigerant such as cooling water for controlling temperature of the polymer electrolyte fuel cell 22, a refrigerant circulation pathway 34 (temperature controlling means) for circulating the refrigerant between the polymer electrolyte fuel cell 22 and the radiator 32, a pump 36 (temperature controlling means) provided in the middle of the refrigerant circulation pathway 34, a temperature sensor 38 (temperature detection means) for measuring temperature of the refrigerant in the refrigerant circulation pathway 34 in the vicinity of the outlet of the polymer electrolyte fuel cell 22, and a controlling device 40 (controlling means) for controlling the output of the pump 36 so as to control the temperature of the polymer electrolyte fuel cell 22 to the range of the predetermined temperature based on temperature information from the temperature sensor 38.

The polymer electrolyte fuel cell 22 has a stack structure wherein membrane/electrode assemblies 10 and separators 18 having grooves formed to constitute flow paths for a fuel gas or an oxidant gas are laminated alternately.

The radiator 32 is so-called radiator and usually air cooling type.

The temperature sensor 38 measures the temperature of the refrigerator in the refrigerant circulation pathway 34 in the vicinity of the outlet of the polymer electrolyte fuel cell 22 to detect the internal temperature of the polymer electrolyte fuel cell 22.

The controlling device 40 is substantially composed of a processing part and an interface part.

The interface part electrically connects the pump 36 and the temperature sensor 38 to the processing part.

The processing part estimates a flow amount of the refrigerant required for controlling the temperature of the polymer electrolyte fuel cell 22 to the predetermined range and controls the output of the pump 36 so as to control the flow amount to be the estimated amount.

The processing part may be realized by a specific hardware or composed of a memory and a central processing unit (CPU) wherein its function is realized by loading program for realizing the function of the processing part to the memory.

Further, the controlling device 40 may be connected to an input device, a display device or the like as a peripheral device. The input device may, for example, be a display touch panel, a switch panel or a keyboard, and the display device may, for example, be CRT or liquid crystal display device.

The fuel cell system 20 is operated as follows.

While oxidant gas (such as air) is supplied to a cathode side of the polymer electrolyte fuel cell 22 from the oxidant gas supplying pathway 24, fuel gas (such as hydrogen) is supplied to an anode side of the polymer electrolyte fuel cell 22 from the fuel gas supplying pathway 26. In the polymer electrolyte fuel cell 22, the oxidant gas and the fuel gas are reacted through a membrane/electrode assembly 10 to carry out power generation.

Cathode exhaust gas which is exhausted from the cathode side of the polymer electrolyte fuel cell 22 is discharged from the cathode exhaust gas pathway 28, and anode exhaust gas which is exhausted from the anode side of the polymer electrolyte fuel cell 22 is discharged from the anode exhaust gas pathway 30. Since the anode exhaust gas contains unreacted fuel gas (such as hydrogen gas), a part of the anode exhaust gas may be returned to the fuel gas supplying pathway 26.

During operation of the polymer electrolyte fuel cell 22, by measuring the temperature of the refrigerant in the refrigerant circulation pathway 34 in the vicinity of the outlet of the polymer electrolyte fuel cell 22 by the temperature sensor 38, the internal temperature of the polymer electrolyte fuel cell 22 can be detected, and the temperature information is sent to the controlling device 40.

Based on the temperature information from the temperature sensor 38, at the processing part of the controlling device 40, a flow amount of the refrigerant required for controlling the temperature of the polymer electrolyte fuel cell 22 to the predetermined temperature range is estimated, and the output of the pump 36 is controlled so as to control the flow amount to be the estimated amount.

The maximum temperature of the polymer electrolyte fuel cell 22 is controlled to be within the range of from 90 to 140° C., preferably controlled to be within the range of from 105 to 120° C. When the maximum temperature of the polymer electrolyte fuel cell 22 is at least 90° C., the radiator 32 can be downsized. The maximum temperature of the polymer electrolyte fuel cell 22 is preferably at most 140° C. from the viewpoint of the heat resistance of the polymer (H) contained in a catalyst layer of the membrane/electrode assembly 10.

The temperature of the polymer electrolyte fuel cell 22 changes depending on the load of the power generation at the time of operation, and the higher the load of the power generation is, the higher the temperature of the polymer electrolyte fuel cell 22 becomes. The oxidant gas or the like is required to have a high relative humidity (at a level of at least 70%) at the temperature of the polymer electrolyte fuel cell for a conventional fuel cell systems. Therefore, the humidity of the oxidant gas to be supplied is controlled to be high by cooling the polymer electrolyte fuel cell by a radiator or the like so that the maximum temperature of the polymer electrolyte fuel cell of which the temperature tends to increase is controlled to be at a level of at most 80° C. However, the fuel cell system of the present invention can be operated under no humidity conditions such that the oxidant gas or the like to be supplied to the polymer electrolyte fuel cells not humidified, whereby the maximum temperature can be increased to a range of from 90 to 140° C. Therefore, the load to cool the polymer electrolyte fuel cell can be remarkably lowered.

In the fuel cell system 20, no means to control humidity such as humidifier for humidifying oxidant gas and fuel gas which are supplied to the polymer electrolyte fuel cell 22 is provided, and the oxidant gas and fuel gas are supplied to the polymer electrolyte fuel cell 22 without being humidified. Therefore, the relative humidity of the oxidant gas and the relative humidity of the fuel gas at a temperature of the polymer electrolyte fuel cell 22 are almost 0%.

However, the fuel gas is exhausted from the anode exhaust gas pathway 30, and the anode exhaust gas contains unreacted fuel gas as well as steam. Therefore, as mentioned above, a part of the anode exhaust gas is returned to the fuel gas supplying pathway 26, and humidified fuel gas is supplied.

In the above explained fuel cell system 20, the polymer (H) is used as a proton conductive polymer contained in a catalyst layer in a membrane/electrode assembly, whereby sufficient power generation characteristics can be obtained, even though the temperature of the polymer electrolyte fuel cell 22 is high at a level of at least 90° C., and the relative humidity of the oxidant gas and the relative humidity of the fuel gas are 0%. Therefore, a humidifier can be omitted, and a radiator 32 (radiator) can be downsized.

(Second Embodiment)

Figure 4:
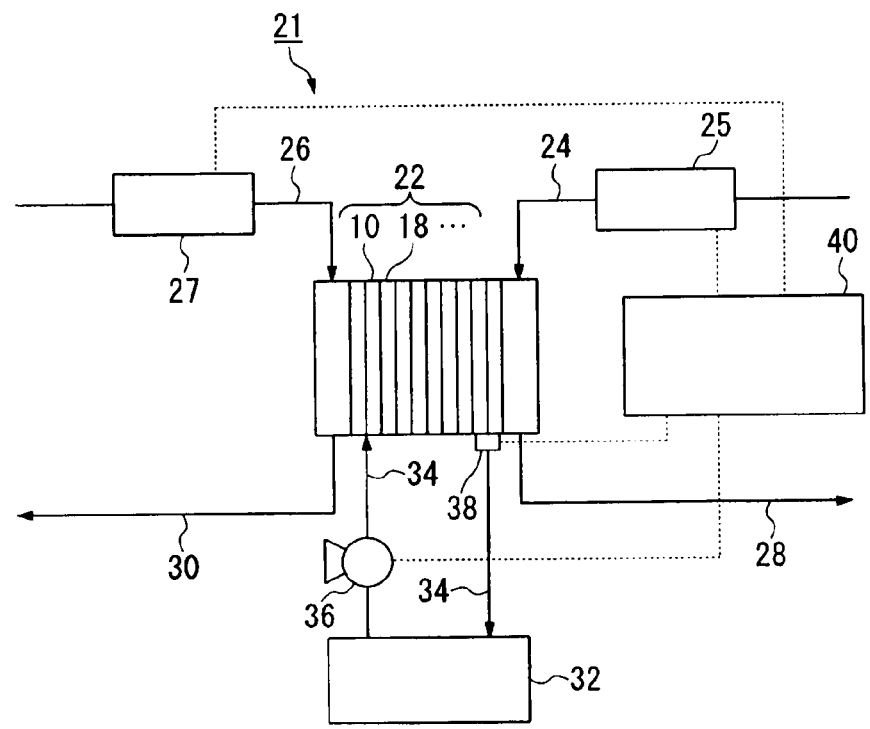
FIG. 4 is a view schematically illustrating another example of the fuel cell system of the present invention.

FIG. 4 is a view schematically illustrating another example of the fuel cell system of the present invention.

Further, in the second embodiment, the same structures as the first embodiment are provided with the same symbols used in FIG. 3, and explanations are omitted.

A fuel cell system 21 comprises a polymer electrolyte fuel cell 22 having plural membrane/electrode assemblies 10, an oxidant gas supplying pathway 24 which supplies oxidant gas (such as air) to a cathode side of the polymer electrolyte fuel cell 22, an oxidant gas humidifier 25 (humidity controlling means) provided in the middle of the oxidant gas supplying pathway 24, a fuel gas supplying pathway 26 which supplies fuel gas (such as hydrogen) to an anode side of the polymer electrolyte fuel cell 22, a fuel gas humidifier 27 (humidity controlling means) provided in the middle of the fuel gas supplying pathway 26, a cathode exhaust gas pathway 28 which discharges cathode exhaust gas exhausted from the cathode side of the polymer electrolyte fuel cell 22, an anode exhaust gas pathway 30 which discharges anode exhaust gas exhausted from the anode side of the polymer electrolyte fuel cell 22, a radiator 32 (temperature controlling means) for decreasing temperature of a refrigerant such as cooling water for controlling temperature of the polymer electrolyte fuel cell 22, a refrigerant circulation pathway 34 (temperature controlling means) for circulating the refrigerant between the polymer electrolyte fuel cell 22 and the radiator 32, a pump 36 (temperature controlling means) provided in the middle of the refrigerant circulation pathway 34, a temperature sensor 38 (temperature detection means) for measuring temperature of the refrigerant in the refrigerant circulation pathway 34 in the vicinity of the outlet of the polymer electrolyte fuel cell 22, and a controlling device 40 (controlling means) for controlling the output of the pump 36 so as to control the temperature of the polymer electrolyte fuel cell 22 to be within the range of the predetermined temperature based on temperature information from the temperature sensor 38 and controlling the oxidant gas humidifier 25 and the fuel gas humidifier 27 based on temperature information from the temperature detector means 38 so that the relative humidities of oxidant gas and fuel gas to be supplied to the polymer electrolyte fuel cell 22 are made to be within the predetermined ranges at a temperature of the polymer electrolyte fuel cell 22.

The controlling device 40 is substantially composed of a processing part and an interface part.

The interface part electrically connects the oxidant gas humidifier 25, the fuel gas humidifier 27, the pump 36 and the temperature sensor 38 to the processing part.

The processing part estimates a flow amount of the refrigerant required for controlling the temperature of the polymer electrolyte fuel cell 22 to be within the predetermined range based on the temperature information from the temperature sensor 38 and controls the output of the pump 36 so as to control the flow amount to be the estimated amount.

Further, the processing part estimates an amount of water required for controlling the relative humidity of the oxidant gas and the fuel gas at the temperature of the polymer electrolyte fuel cell 22 to be the predetermined relative humidity based on the temperature information from the temperature sensor 38 and controls the oxidant gas humidifier 25 and the fuel gas humidifier 27 for supplying the estimated amount of water to each gas.

The fuel cell system 21 is operated as follows.

While oxidant gas (such as air) which is humidified by the oxidant gas humidifier 25 is supplied to a cathode side of the polymer electrolyte fuel cell 22 from the oxidant gas supplying pathway 24, fuel gas (such as hydrogen) which is humidified by the fuel gas humidifier 27 is supplied to an anode side of the polymer electrolyte fuel cell 22 from the fuel gas supplying pathway 26. In the polymer electrolyte fuel cell 22, the oxidant gas and the fuel gas are reacted through a membrane/electrode assembly 10 to carry out power generation.

Cathode exhaust gas which is exhausted from the cathode side of the polymer electrolyte fuel cell 22 is discharged from the cathode exhaust gas pathway 28, and anode exhaust gas which is exhausted from the anode side of the polymer electrolyte fuel cell 22 is discharged from the anode exhaust gas pathway 30. Since the anode exhaust gas contains unreacted fuel gas (such as hydrogen gas), a part of the anode exhaust gas may be returned to the fuel gas supplying pathway 26.

During operation of the polymer electrolyte fuel cell 22, by measuring the temperature of the refrigerant in the refrigerant circulation pathway 34 in the vicinity of the outlet of the polymer electrolyte fuel cell 22 by the temperature sensor 38, the internal temperature of the polymer electrolyte fuel cell 22 can be detected, and the temperature information is sent to the controlling device 40.

Based on the temperature information from the temperature sensor 38, at the processing part of the controlling device 40, a flow amount of the refrigerant required for controlling the temperature of the polymer electrolyte fuel cell 22 to be within the predetermined range is estimated, and the output of the pump 36 is controlled so as to control the flow amount to be the estimated amount.

Further, based on the temperature information from the temperature sensor 38, an amount of water required for controlling the relative humidity of oxidant gas and fuel gas at a temperature of the polymer electrolyte fuel cell 22 to be the predetermined relative humidity, is estimated at the processing part of the controlling device 40, and the oxidant gas humidifier 25 and the fuel gas humidifier 27 are controlled so as to supply the estimated amount of water to each gas.

The maximum temperature of the polymer electrolyte fuel cell 22 is controlled to be within the range of from 90 to 140° C., preferably controlled to be within the range of from 105 to 120° C. When the maximum temperature of the polymer electrolyte fuel cell 22 is at least 90° C., the radiator 32 can be downsized. The maximum temperature of the polymer electrolyte fuel cell 22 is preferably at most 140° C. from the viewpoint of the heat resistance of the polymer (H) contained in a catalyst layer of the membrane/electrode assembly 10.

The temperature of the polymer electrolyte fuel cell 22 changes depending on the load of the power generation at the time of driving, and the higher the load of the power generation is, the higher the temperature of the polymer electrolyte fuel cell 22 becomes. The oxidant gas or the like is required to have a high relative humidity (at a level of at least 70%) at the temperature of the polymer electrolyte fuel cell for a conventional fuel cell system. Therefore, the humidity of the oxidant gas to be supplied is controlled to be high by cooling the polymer electrolyte fuel cell by a radiator or the like so that the maximum temperature of the polymer electrolyte fuel cell of which the temperature tends to increase is controlled to be at a level of at most 80° C. However, the fuel cell system of the present invention can be operated under low humidity conditions such that the relative humidity of the oxidant gas or the like to be supplied to the polymer electrolyte fuel cells is at most 30% at a temperature of the polymer electrolyte fuel cell 22, whereby the maximum temperature can be increased to a range of from 90 to 140° C. Therefore, the load to cool the polymer electrolyte fuel cells can be remarkably lowered.

The oxidant gas is controlled so that the relative humidity at the temperature of the polymer electrolyte fuel cell 22 becomes at most 30%, preferably at most 10%. When the relative humidity of the oxidant gas at the temperature of the polymer electrolyte fuel cell 22 is at most 30%, the oxidant gas humidifier 25 can be downsized.

The fuel gas is also preferably controlled so that the relative humidity at the temperature of the polymer electrolyte fuel cell 22 becomes at most 30%, more preferably at most 10%, in the same manner as the oxidant gas.

In the above explained fuel cell system 21, the polymer (H) is used as a proton conductive polymer contained in a catalyst layer in a membrane/electrode assembly, and sufficient power generation characteristics can be thereby obtained, even though the temperature of the polymer electrolyte fuel cell 22 is high at a level of at least 90° C., and the relative humidities of the oxidant gas and the fuel gas are at most 30%. Therefore, each humidifier can be downsized, and the radiator 32 (radiator) can be downsized.

(Other Embodiments)

Further, the fuel cell system of the present invention is not restricted to examples of Figures.

For example, in the fuel cell system for stationary use, instead of the radiator 32, a means to supply cooling water (such as tap water tank) may be provided, and cooling water from the means to supply cooling water is used to cool the polymer electrolyte fuel cell 22, and hot water to be recovered from the polymer electrolyte fuel cell 22 may be used as application of hot-water supply for stationary use.

EXAMPLES

Now, the present invention will be described in detail with reference to Examples. However, it should be understood that the present invention is by no means restricted to such specific Examples. Examples 1 to 17 are Preparation Examples, and Examples 18 to 34 are Evaluation Examples.

(Ion Exchange Capacity)

The ion exchange capacity of the polymer (H) was obtained by the following method.

The polymer (H) was put in a glove box and left to stand in an atmosphere into which dry nitrogen was blown for 24 hours or longer and dried. The dry mass of the polymer (H) was measured in the glove box.

The polymer (H) was immersed in a 2 mol/L sodium chloride aqueous solution and left to stand at 60° C. for one hour and then cooled to room temperature. The sodium chloride aqueous solution in which the polymer (H) had been immersed was titrated with a 0.5 mol/L sodium hydroxide aqueous solution to determine the ion exchange capacity of the polymer (H).

(Monomer (a))

Preparation of Compound (m11-1):

Compound (m11-1) was prepared in accordance with the method disclosed in Examples at pages 37 to 42 of WO2003/037885.

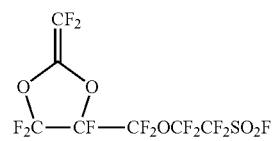

(m11-1)

Preparation of Compound (m12-1):

Compound (m12-1) was prepared in accordance with the method disclosed in Example 1 of JP-A-2006-152249.

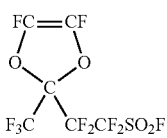 (m12-1)

Compound (m14-4):

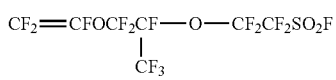 (m-14-4)

Compound (m14-5):

$CF_2{=}CFO(CF_2)_2SO_2F$ (m14-5)

Preparation of Compound (m15-1):

Compound (m15-1) was prepared in accordance with the method disclosed in Example 1 of JP-A-2008-202039.

 (m-15-1)

(Monomer (b))
Compound (m21-1):

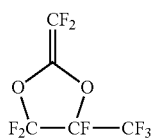 (m21-1)

Compound (m22-1):

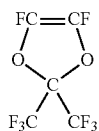 (m22-1)

(Radical Initiator)
Compound (i-1):

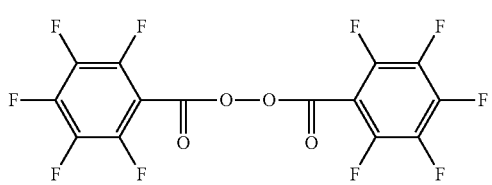 (i-1)

Compound (i-2):

$((CH_3)_2CHOCOO)_2$ (i-2)

Compound (i-3):

$(C_3F_7COO)_2$ (i-3)

(Solvent)
Compound (s-1):

$CClF_2CF_2CHClF$ (s-1)

Compound (s-2):

$CH_3CCl_2F$ (s-2)

Example 1

Into a stainless steel autoclave having an internal capacity of 125 mL, 9.16 g of compound (m11-1), 5.67 g of compound (m21-1), 5.0 g of compound (s-1) and 2.4 mg of compound (i-1) were charged, followed by sufficient deaeration under cooling with liquid nitrogen. Then, the temperature was raised to 65° C., followed by stirring for 23.5 hours, and then the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-1). The yield was 6.35 g.

Polymer (F-1) was immersed in an aqueous solution containing 20 mass % of methanol and 15 mass % of potassium hydroxide at 50° C. for 40 hours to hydrolyze and convert —SO$_2$F groups in polymer (F-1) to —SO$_3$K groups. Then, the polymer was immersed in a 3 mol/L hydrochloric acid aqueous solution at room temperature for 2 hours. The hydrochloric acid aqueous solution was changed, and the same treatment was further carried out four times. Polymer (H-1) having sulfonic acid groups converted from —SO$_3$K groups in the polymer was obtained. Polymer (H-1) was sufficiently washed with ultrapure water. The ion exchange capacity of polymer (H-1) was measured. The results are shown in Table 1.

To polymer (H-1), a mixed solvent of ethanol and water (ethanol/water=70/30 mass ratio) was added to adjust the solid content concentration to 15 mass %, followed by stirring using an autoclave at 125° C. for 8 hours. Water was further added to adjust the solid content concentration to 7.0 mass % to obtain liquid composition (D-1) having polymer (H-1) dispersed in a dispersion medium. The composition of the dispersion medium was ethanol/water=35/65 (mass ratio).

Example 2

Into a stainless steel autoclave having an internal capacity of 125 mL, 9.38 g of compound (m11-1), 11.36 g of compound (m21-1), 28.59 g of compound (s-1) and 80.2 mg of compound (i-1) were charged, followed by sufficient deaeration under cooling with liquid nitrogen. Then, the temperature was raised to 65° C., followed by stirring for 5.6 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-2). The yield was 14.0 g.

Using polymer (F-2), polymer (H-2) and liquid composition (D-2) were obtained in the same manner as in Example 1. Further, the ion exchange capacity of the polymer (H-2) was measured. The results are shown in Table 1.

Example 3

Into a stainless steel autoclave having an internal capacity of 31 mL, 7.2 g of compound (m11-1), 3.9 g of compound (m21-1), 12.5 g of compound (s-1), 2.0 g of TFE and 5.9 mg of compound (i-1), were charged, followed by sufficient deaeration under cooling with liquid nitrogen. Then, the temperature was raised to 65° C., followed by stirring for 6 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-3). The yield was 6.1 g.

The composition of repeating units constituting the copolymer was analyzed by $^{19}$F-NMR, and as a result, the repeating units based on TFE was 13 mol %.

Using polymer (F-3), polymer (H-3) and liquid composition (D-3) were obtained in the same manner as in Example 1. Further, the ion exchange capacity of the polymer (H-3) was measured. The results are shown in Table 1.

Example 4

Into a stainless steel autoclave having an internal capacity of 125 mL, 5.97 g of compound (m11-1), 13.70 g of compound (m22-1), 13.75 g of compound (s-1) and 17.1 mg of compound (i-1), were charged, followed by sufficient deaeration under cooling with liquid nitrogen. Then, the temperature was raised to 65° C. and held for 6 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-4). The yield was 3.7 g.

Using polymer (F-4), polymer (H-4) was obtained in the same manner as in Example 1. The ion exchange capacity of polymer (H-4) was measured. The results are shown in Table 1.

To polymer (H-4), a mixed solvent of ethanol and water (ethanol/water=60/40 mass ratio) was added to adjust the solid content concentration to 15 mass %, followed by stirring using an autoclave at 105° C. for 8 hours to obtain liquid composition (D-4) having polymer (H-4) dispersed in a dispersion medium.

Example 5

Into a stainless steel autoclave having an internal capacity of 125 mL, 11.17 g of compound (m11-1), 23.26 g of compound (m22-1), 12.06 g of compound (s-1) and 22.3 mg of compound (i-1), were charged, followed by sufficient deaeration under cooling with liquid nitrogen. Then, the temperature was raised to 65° C., followed by stirring for 18 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-5). The yield was 14.8 g.

Using polymer (F-5), polymer (H-5) was obtained in the same manner as in Example 1. Further, the ion exchange capacity of polymer (H-5) was measured. The results are shown in Table 1.

Using polymer (H-5), liquid composition (D-5) was obtained in the same manner as in Example 4.

Example 6

Into a stainless steel autoclave having an internal capacity of 125 mL, 22.26 g of compound (m11-1), 15.25 g of compound (m22-1), 11.0 g of compound (s-1) and 24 mg of compound (i-1), are charged, followed by sufficient deaeration under cooling with liquid nitrogen. Then, 3.0 g of TFE is charged, the temperature is raised to 65° C., followed by stirring for 18 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-6). The yield is 15.0 g.

The composition of repeating units constituting the copolymer was analyzed by $^{19}$F-NMR, and as a result, the repeating units based on TFE was 14 mol %.

Using polymer (F-6), polymer (H-6) is obtained in the same manner as in Example 1. The ion exchange capacity of the polymer (H-6) is measured. The results are shown in Table 1.

Using polymer (H-6), liquid composition (D-6) is obtained in the same manner as in Example 4.

Example 7

Into a stainless steel autoclave having an internal capacity of 125 mL, 15.0 g of compound (m22-1), 15.29 g of compound (m12-1), 10.0 g of compound (s-1) and 23 mg of compound (i-1), are charged, followed by sufficient deaeration under cooling with liquid nitrogen. Then, the temperature is raised to 65° C., followed by stirring for 18 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-7). The yield is 12.0 g.

Using polymer (F-7), polymer (H-7) is obtained in the same manner as in Example 1. The ion exchange capacity of polymer (H-7) is measured. The results are shown in Table 1.

Using polymer (H-7), liquid composition (D-7) is obtained in the same manner as in Example 4.

Example 8

Into a stainless steel autoclave having an internal capacity of 125 mL, 9.15 g of compound (m22-1), 45.65 g of compound (m15-1) and 6.4 mg of compound (i-2), were charged, followed by sufficient deaeration under cooling with liquid nitrogen. Then, the temperature was raised to 40° C. and held stirring for 24.5 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-8). The yield was 4.5 g.

Using polymer (F-8), polymer (H-8) was obtained in the same manner as in Example 1. Further, the ion exchange capacity of the polymer (H-8) was measured. The results are shown in Table 1.

Using polymer (H-8), liquid composition (D-8) was obtained in the same manner as in Example 4.

Example 9

Into a stainless steel autoclave having an internal capacity of 125 mL, 11.71 g of compound (m22-1), 95.15 g of compound (m15-1) and 33 mg of compound (i-2), are charged, followed by sufficient deaeration under cooling with liquid nitrogen. Then, 0.6 g of TFE is charged, the temperature is raised to 40° C., followed by stirring for 18 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-9). The yield is 11.5 g.

The composition of repeating units constituting the copolymer was analyzed by $^{19}$F-NMR, and as a result, the repeating units based on TFE was 10 mol %.

Using polymer (F-9), polymer (H-9) is obtained in the same manner as in Example 1. The ion exchange capacity of polymer (H-9) is measured. The results are shown in Table 1.

Using polymer (H-9), liquid composition (D-9) is obtained in the same manner as in Example 4.

Example 10

Into a stainless steel autoclave having an internal capacity of 125 mL, 11.47 g of compound (m22-1), 66.9 g of compound (m14-4) and 23 mg of compound (i-2), are charged, followed by sufficient deaeration under cooling with liquid nitrogen. Then, the temperature is raised to 40° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-10). The yield is 19.5 g.

Using polymer (F-10), polymer (H-10) and liquid composition (D-10) are obtained in the same manner as in Example 1. The ion exchange capacity of polymer (H-10) is measured. The results are shown in Table 1.

Example 11

Into a stainless steel autoclave having an internal capacity of 230 mL, 27.84 g of compound (m22-1), 219.4 g of compound (m14-4) and 80 mg of compound (i-2) were charged, followed by sufficient deaeration under cooling with liquid nitrogen. Then, 6.0 g of TFE was charged, the temperature was raised to 40° C., followed by stirring for 24 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-11). The yield was 28 g.

The composition of repeating units constituting the copolymer was analyzed by $^{19}$F-NMR, and as a result, the repeating units based on TFE was 21 mol %.

Using polymer (F-11), polymer (H-11) and liquid composition (D-11) were obtained in the same manner as in Example 1. Further, the ion exchange capacity of polymer (H-11) was measured. The results are shown in Table 1.

Example 12

Into a stainless steel autoclave having an internal capacity of 125 mL, 24.4 g of compound (m22-1), 75.6 g of compound (m14-5) and 30 mg of compound (i-2), are charged, followed by sufficient deaeration under cooling with liquid nitrogen. Then, the temperature is raised to 40° C., followed by stirring for 27 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-12). The yield is 25 g.

Using polymer (F-12), polymer (H-12) is obtained in the same manner as in Example 1. The ion exchange capacity of polymer (H-12) is measured. The results are shown in Table 1.

Using polymer (H-12), liquid composition (D-12) is obtained in the same manner as in Example 4.

Example 13

Into a stainless steel autoclave having an internal capacity of 125 mL, 21.96 g of compound (m22-1), 84.0 g of compound (m14-5) and 32 mg of compound (i-2), are charged, followed by sufficient deaeration under cooling with liquid nitrogen. Then, 5.55 g of TFE is charged, the temperature is raised to 40° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-13). The yield is 26 g.

The composition of repeating units constituting the copolymer was analyzed by $^{19}$F-NMR, and as a result, the repeating units based on TFE was 31 mol %.

Using polymer (F-13), polymer (H-13) is obtained in the same manner as in Example 1. The ion exchange capacity of polymer (H-13) is measured. The results are shown in Table 1.

Using polymer (H-13), liquid composition (D-13) is obtained in the same manner as in Example 4.

Example 14

Into a stainless steel autoclave having an internal capacity of 1005 mL, 30.36 g of compound (m11-1), 665.8 g of compound (s-1), 279 mg of methanol and 36.8 g of compound (i-2), were charged, followed by sufficient deaeration under cooling with liquid nitrogen. Then, the temperature was raised to 40° C., and then 45.8 g of TFE was charged, followed by stirring for 5 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-14). The yield was 22.8 g.

Using polymer (F-14), polymer (H-14) and liquid composition (D-14) were obtained in the same manner as in Example 1. Further, the ion exchange capacity of polymer (H-14) was measured. The results are shown in Table 1.

Example 15

Into a stainless steel autoclave having an internal capacity of 230 mL, 21.2 g of compound (m11-1), 170 g of compound (s-1) and 9.5 mg of compound (i-2) are charged, followed by sufficient deaeration under cooling with liquid nitrogen. Then, 20 g of TFE is charged, the temperature is raised to 40° C., followed by stirring for 7 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-15). The yield is 11.5 g.

Using polymer (F-15), polymer (H-15) and liquid composition (D-15) are obtained in the same manner as in Example 1. Further, the ion exchange capacity of the polymer (H-15) is measured. The results are shown in Table 1.

Example 16

Into a stainless steel autoclave having an internal capacity of 125 mL, 49.64 g of compound (m14-4), 28.22 g of compound (s-1) and 38.9 mg of compound (i-3) dissolved in compound (s-1) at a concentration of 3.2 mass % were charged, followed by sufficient deaeration under cooling with liquid nitrogen. Then, the temperature was raised to 30° C., and TFE was introduced to the system to maintain the pressure under 0.37 MPaG. After stirring for 4.8 hours, the autoclave was cooled to terminate the reaction.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-16). The yield was 15.0 g.

Using polymer (F-16), polymer (H-16) and liquid composition (D-16) were obtained in the same manner as in Example 1. Further, the ion exchange capacity of the polymer (H-16) was measured. The results are shown in Table 1.

Example 17

Into a stainless steel autoclave having an internal capacity of 125 mL, 45.9 g of compound (m15-1), 16.5 g of compound (s-1) and 12.65 mg compound (i-2) were charged, followed by sufficient deaeration under cooling with liquid nitrogen. Then, the temperature was raised to 40° C., and TFE was introduced to the system to maintain the pressure under 0.55 MPaG. After stirring for 4.3 hours at 40° C., gas in the system was purged, and the autoclave was cooled to terminate the reaction.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-17). The yield was 6.5 g.

Using polymer (F-17), polymer (H-17) was obtained in the same manner as in Example 1. The ion exchange capacity of polymer (H-17) was measured. The results are shown in Table 1.

To polymer (H-17), a mixed solvent of ethanol, water and 1-butanol (ethanol/water/1-butanol=35/50/15 mass ratio) was added to adjust the solid content concentration to 15 mass %, followed by stirring using an autoclave at 125° C. for 8 hours. Water was further added to adjust the solid content concentration to 9 mass % thereby to obtain liquid composition (D-10) having polymer (H-10) dispersed in a dispersion medium. The composition of the dispersion medium was ethanol/water/1-butanol=20/70/10 (mass ratio).

TABLE 1

| Ex. | Ion exchange capacity (meq/g dry resin) |
|---|---|
| 1 | 1.54 |
| 2 | 1.13 |
| 3 | 1.48 |
| 4 | 1.68 |
| 5 | 1.34 |
| 6 | 1.81 |
| 7 | 1.41 |
| 8 | 1.34 |
| 9 | 1.72 |
| 10 | 1.10 |
| 11 | 1.20 |
| 12 | 1.21 |
| 13 | 1.15 |
| 14 | 1.59 |
| 15 | 1.71 |
| 16 | 1.10 |
| 17 | 1.51 |

Example 18

39 g of water was added to 10 g of a supported catalyst having 50 mass % of platinum supported on a carbon powder, followed by irradiation with ultrasonic waves for 10 minutes to obtain a dispersion of the catalyst. To the dispersion of the catalyst, 60 g of liquid composition (D-1) was added, and 64 g of ethanol was further added to adjust the solid content concentration to 8 mass % to obtain a fluid for forming a catalyst layer. The fluid was applied on a separately prepared sheet comprising a copolymer of ethylene and TFE (tradename: Aflex 100N, manufactured by Asahi Glass Company, Limited, thickness: 100 μm) (hereinafter referred to as an ETFE sheet) and dried at 80° C. for 30 minutes and further subjected to heat treatment at 165° C. for 30 minutes to form a catalyst layer having an amount of platinum of 0.35 mg/cm$^2$.

Liquid composition (D-17) was applied on an ETFE sheet by means of a die coater, dried at 80° C. for 30 minutes and further subjected to heat treatment at 190° C. for 30 minutes to form a polymer electrolyte membrane having a thickness of 20 μm.

The ETFE sheet was separated from the polymer electrolyte membrane, the polymer electrolyte membrane was sandwiched between two catalyst layers provided with the ETFE film and heat pressed at a pressing temperature of 160° C. for a pressing time of 5 minutes under a pressure of 3 MPa to bond the catalyst layers on both sides of the polymer electrolyte membrane, and the ETFE films were separated from the catalyst layers to obtain a membrane/catalyst layer assembly having an electrode area of 25 cm$^2$.

On a gas diffusion layer comprising carbon paper, a carbon layer comprising carbon and polytetrafluoroethylene was formed.

The membrane/catalyst layer assembly was sandwiched between gas diffusion layers so that the carbon layer and the catalyst layer were in contact with each other, to obtain a membrane/electrode assembly.

The membrane/electrode assembly was assembled into a cell for power generation, and the power generation characteristics were evaluated under the following two conditions.

(Evaluation Conditions 1)

While the temperature of the membrane/electrode assembly was maintained at 95° C., hydrogen (utilization ratio: 50%) was supplied to the anode, and air (utilization ratio: 50%) was supplied to the cathode, under a pressure of 175 kPa (absolute pressure). Both hydrogen and air were humidified at a relative humidity of 20% RH and supplied, and the cell voltage when the current density was 1.0 A/cm$^2$ was recorded and evaluated under the following standards. The results are shown in Table 2.

○: Cell voltage being 0.65 V or higher.
Δ: Cell voltage being 0.6 V or higher and less than 0.65 V.
×: Cell voltage being less than 0.6 V.

(Evaluation Conditions 2)

While the temperature of the membrane/electrode assembly was maintained at 100° C., hydrogen (utilization ratio: 50%) was supplied to the anode, and air (utilization ratio: 50%) was supplied to the cathode, under a pressure of 175 kPa (absolute pressure). Both hydrogen and air were supplied without being humidified, and the cell voltage when the current density was 1.0 A/cm$^2$ was recorded and evaluated under the following standards. The results are shown in Table 2.

⊚: Cell voltage being 0.55 V or higher.
○: Cell voltage being 0.5 V or higher and less than 0.55 V.
Δ: Cell voltage being 0.45 V or higher and less than 0.5 V.
×: Cell voltage being less than 0.45 V.

Examples 19 to 34

A membrane/electrode assembly was prepared and the power generation characteristics were evaluated in the same manner as in Example 18 except that liquid composition (D-1) used for formation of the catalyst layers was changed to each of liquid compositions (D-2) to (D-17). The evaluation results are shown in Table 2.

TABLE 2

| Ex. | Dispersion | Evaluation conditions 1 | Evaluation conditions 2 |
|---|---|---|---|
| 18 | D-1 | ○ | ⊚ |
| 19 | D-2 | Δ | Δ |
| 20 | D-3 | Δ | ○ |
| 21 | D-4 | ○ | ⊚ |
| 22 | D-5 | ○ | ○ |
| 23 | D-6 | ○ | ⊚ |
| 24 | D-7 | ○ | ⊚ |
| 25 | D-8 | Δ | ○ |
| 26 | D-9 | ○ | ⊚ |
| 27 | D-10 | Δ | Δ |
| 28 | D-11 | Δ | ○ |
| 29 | D-12 | Δ | ○ |
| 30 | D-13 | Δ | Δ |
| 31 | D-14 | ○ | ○ |
| 32 | D-15 | ○ | ⊚ |
| 33 | D-16 | × | × |
| 34 | D-17 | × | × |

The fuel cell system of the present invention is useful as a fuel cell system for automobiles and a fuel cell system for stationary use, which is simplified, and of which cost is reduced.

Meaning of Symbols
10: Membrane/electrode assembly
11: Catalyst layer
13: Anode
14: Cathode
15: Polymer electrolyte membrane
20: Fuel cell system
21: Fuel cell system
22: Polymer electrolyte fuel cell
25: Oxidant gas humidifier (humidity controlling means)
27: Fuel gas humidifier (humidity controlling means)
32: Radiator (temperature controlling means)
34: Refrigerant circulation pathway (temperature controlling means)
36: Pump (temperature controlling means)
38: Temperature sensor (temperature detection means)
40: Controlling device (controlling means)

The entire disclosure of Japanese Patent Application No. 2009-179064 filed on Jul. 31, 2009 and U.S. Provisional Patent Application No. 61/299,585 filed on Jan. 29, 2010 including specification, claims, drawings and summary is incorporated herein by reference in its entirety.

What is claimed is:

1. A fuel cell system comprising:
a polymer electrolyte fuel cell having a membrane/electrode assembly,
   temperature controlling means for controlling temperature of the polymer electrolyte fuel cell,
   temperature detection means for detecting temperature of the polymer electrolyte fuel cell,
   controlling means for controlling the temperature controlling means for controlling a maximum temperature of the polymer electrolyte fuel cell within a range from 90 to 140° C., based on temperature information from the temperature detection means, and
   humidity controlling means for controlling humidity of oxidant gas supplied to the polymer electrolyte fuel cell,
   wherein the membrane/electrode assembly comprises an anode including a catalyst layer containing a proton conductive polymer, a cathode including a catalyst layer containing a proton conductive polymer and a polymer electrolyte membrane disposed between the anode and the cathode, wherein the proton conductive polymer contained in the catalyst layer of at least one of the cathode and the anode is a polymer which has repeating units based on a perfluoromonomer having an alicyclic structure or a perfluoromonomer capable of forming an alicyclic structure by cyclic polymerization, and has ion exchange groups, and
wherein the controlling means further controls the humidity controlling means based on the temperature information from the temperature detection means so that the relative humidity of the oxidant gas supplied to the polymer electrolyte fuel cell is at most 30% at the maximum temperature of the polymer electrolyte fuel cell.

2. A fuel cell system comprising:
a polymer electrolyte fuel cell having a membrane/electrode assembly,
   temperature controlling means for controlling temperature of the polymer electrolyte fuel cell, temperature detection means for detecting temperature of the polymer electrolyte fuel cell, controlling means for controlling the temperature controlling means for controlling a maximum temperature of the polymer electrolyte fuel cell within a range from 90 to 140° C., based on temperature information from the temperature detection means, wherein the membrane/electrode assembly comprises an anode including a catalyst layer containing a proton conductive polymer, a cathode including a catalyst layer containing a proton conductive polymer and a polymer electrolyte membrane disposed between the anode and the cathode, wherein the proton conductive polymer contained in the catalyst layer of at least one of the cathode and the anode is a polymer which has repeating units based on a perfluoromonomer having an alicyclic structure or a perfluoromonomer capable of forming an alicyclic structure by cyclic polymerization, and has ion exchange groups, and wherein the oxidant gas supplied to the polymer electrolyte fuel cell is not humidified.

3. The fuel cell system according to claim 1, wherein the polymer is a polymer having repeating units (A) based on a perfluoromonomer having an ion exchange group and repeating units (B) based on a perfluoromonomer having no ion exchange group, at least one of the repeating units (A) and the repeating units (B) having an alicyclic structure.

4. The fuel cell system according to claim 2, wherein the polymer is a polymer having repeating units (A) based on a perfluoromonomer having an ion exchange group and repeating units (B) based on a perfluoromonomer having no ion exchange group, at least one of the repeating units (A) and the repeating units (B) having an alicyclic structure.

5. The fuel cell system according to claim 1, wherein the polymer has an ion exchange capacity of from 1.2 to 2.8 meq/g dry resin.

6. The fuel cell system according to claim 2, wherein the polymer has an ion exchange capacity of from 1.2 to 2.8 meq/g dry resin.

7. The fuel cell system according to claim 3, wherein the polymer has an ion exchange capacity of from 1.2 to 2.8 meq/g dry resin.

8. The fuel cell system according to claim 4, wherein the polymer has an ion exchange capacity of from 1.2 to 2.8 meq/g dry resin.

9. A fuel cell system comprising:
a polymer electrolyte fuel cell having a membrane/electrode assembly,
    a radiator configured to control temperature of the polymer electrolyte fuel cell,
    a temperature sensor configured to detect temperature of the polymer electrolyte fuel cell,
    a controlling device programmed to control the radiator to control a maximum temperature of the polymer electrolyte fuel cell within a range from 90 to 140° C., based on temperature information from the temperature sensor, and
    an oxidant gas humidifier configured to control humidity of oxidant gas supplied to the polymer electrolyte fuel cell,
    wherein the membrane/electrode assembly comprises an anode including a catalyst layer containing a proton conductive polymer, a cathode including a catalyst layer containing a proton conductive polymer and a polymer electrolyte membrane disposed between the anode and the cathode, wherein the proton conductive polymer contained in the catalyst layer of at least one of the cathode and the anode is a polymer which has repeating units based on a perfluoromonomer having an alicyclic structure or a perfluoromonomer capable of forming an alicyclic structure by cyclic polymerization, and has ion exchange groups, and
    wherein the controlling device is further programmed to control the oxidant gas humidifier based on the temperature information from the temperature sensor so that the relative humidity of the oxidant gas supplied to the polymer electrolyte fuel cell is at most 30% at the maximum temperature of the polymer electrolyte fuel cell.

10. A fuel cell system comprising:
a polymer electrolyte fuel cell having a membrane/electrode assembly,
    a radiator configured to control temperature of the polymer electrolyte fuel cell,
    a temperature sensor configured to detect temperature of the polymer electrolyte fuel cell,
    a controlling device programmed to control the radiator to control a maximum temperature of the polymer electrolyte fuel cell within a range from 90 to 140° C., based on temperature information from the temperature sensor,
    wherein the membrane/electrode assembly comprises an anode including a catalyst layer containing a proton conductive polymer, a cathode including a catalyst layer containing a proton conductive polymer and a polymer electrolyte membrane disposed between the anode and the cathode, wherein the proton conductive polymer contained in the catalyst layer of at least one of the cathode and the anode is a polymer which has repeating units based on a perfluoromonomer having an alicyclic structure or a perfluoromonomer capable of forming an alicyclic structure by cyclic polymerization, and has ion exchange groups, and
    wherein the oxidant gas supplied to the polymer electrolyte fuel cell is not humidified.

11. The fuel cell system according to claim 9, wherein the polymer is a polymer having repeating units (A) based on a perfluoromonomer having an ion exchange group and repeating units (B) based on a perfluoromonomer having no ion exchange group, at least one of the repeating units (A) and the repeating units (B) having an alicyclic structure.

12. The fuel cell system according to claim 10, wherein the polymer is a polymer having repeating units (A) based on a perfluoromonomer having an ion exchange group and repeating units (B) based on a perfluoromonomer having no ion exchange group, at least one of the repeating units (A) and the repeating units (B) having an alicyclic structure.

13. The fuel cell system according to claim 9, wherein the polymer has an ion exchange capacity of from 1.2 to 2.8 meq/g dry resin.

14. The fuel cell system according to claim 10, wherein the polymer has an ion exchange capacity of from 1.2 to 2.8 meq/g dry resin.

* * * * *